United States Patent
Dong et al.

(10) Patent No.: US 11,746,753 B2
(45) Date of Patent: Sep. 5, 2023

(54) METHOD AND APPARATUS FOR DETECTING FAULT, METHOD AND APPARATUS FOR TRAINING MODEL, AND DEVICE AND STORAGE MEDIUM

(71) Applicants: ENVISION DIGITAL INTERNATIONAL PTE. LTD., Singapore (SG); SHANGHAI ENVISION DIGITAL CO., LTD., Shanghai (CN)

(72) Inventors: Ao Dong, Shanghai (CN); Qingsheng Zhao, Shanghai (CN); Zhongji Yin, Shanghai (CN); Yong Ai, Shanghai (CN); Weiyu Cui, Shanghai (CN)

(73) Assignees: ENVISION DIGITAL INTERNATIONAL PTE. LTD., Singapore (SG); SHANGHAI ENVISION DIGITAL CO., LTD., Shanghai (CN)

(*) Notice: Subject to any disclaimer, the term of this patent is extended or adjusted under 35 U.S.C. 154(b) by 0 days.

(21) Appl. No.: 17/779,968

(22) PCT Filed: Nov. 19, 2020

(86) PCT No.: PCT/SG2020/050674
§ 371 (c)(1),
(2) Date: May 25, 2022

(87) PCT Pub. No.: WO2021/107866
PCT Pub. Date: Jun. 3, 2021

(65) Prior Publication Data
US 2023/0003198 A1    Jan. 5, 2023

(30) Foreign Application Priority Data
Nov. 25, 2019 (CN) .......................... 201911163284.5

(51) Int. Cl.
*F03D 17/00* (2016.01)
*F03D 7/04* (2006.01)

(52) U.S. Cl.
CPC ............. *F03D 17/00* (2016.05); *F03D 7/045* (2013.01); *F05B 2260/80* (2013.01);
(Continued)

(58) Field of Classification Search
CPC ...... F03D 7/045; F03D 17/00; F05B 2260/80; F05B 2270/303; F05B 2270/304; F05B 2270/404; F05B 2270/803
See application file for complete search history.

(56) References Cited

U.S. PATENT DOCUMENTS

2010/0143116 A1   6/2010   Zang et al.
2012/0143565 A1*   6/2012   Graham, III ....... G05B 23/0237
                                                                                                          702/181
(Continued)

FOREIGN PATENT DOCUMENTS

CN        104614179 A   *   5/2015
CN        103743563 B   *   1/2016  ............ G01M 13/02
(Continued)

OTHER PUBLICATIONS

Substantive Examination Report dated Dec. 8, 2022 for Malaysia Application No. PI 2022002629.
(Continued)

*Primary Examiner* — Ronald D Hartman, Jr.
(74) *Attorney, Agent, or Firm* — JCIP; Joseph G. Chu; Jeremy I. Maynard

(57) ABSTRACT

Disclosed are a method and apparatus for detecting a fault, and a method and apparatus for training a model. The method includes: acquiring characteristic data and actual temperature of a first wind turbine among n wind turbines, wherein the characteristic data of the first wind turbine is
(Continued)

intended to characterize a working state of the first wind turbine, and n is an integer greater than 1; acquiring a prediction temperature set by inputting the characteristic data of the first wind turbine into a temperature prediction model corresponding to each of the n wind turbines; and detecting, based on the predicted temperature set and the actual temperature of the first wind turbine, whether the first wind turbine encounters a fault. Compared with the related art which depends on the working experience of the staff, the technical solution according to the embodiments of the present disclosure can more accurately detect whether a wind turbine encounters a fault, and provide early warning in time, so as to reduce the failure rate of the wind turbine.

10 Claims, 4 Drawing Sheets

(52) U.S. Cl.
CPC ... *F05B 2270/303* (2013.01); *F05B 2270/304* (2013.01); *F05B 2270/404* (2013.01); *F05B 2270/803* (2013.01)

(56) References Cited

U.S. PATENT DOCUMENTS

| | | | | |
|---|---|---|---|---|
| 2012/0203704 | A1* | 8/2012 | Nakamura | G06Q 10/06312 705/305 |
| 2013/0161956 | A1 | 6/2013 | Evans et al. | |
| 2014/0257751 | A1* | 9/2014 | Edenfeld | F03D 80/50 702/183 |
| 2017/0352245 | A1* | 12/2017 | Maher | G08B 21/182 |
| 2020/0201950 | A1* | 6/2020 | Wang | F03D 17/00 |
| 2020/0210537 | A1* | 7/2020 | Wang | G06F 30/20 |
| 2020/0210538 | A1* | 7/2020 | Wang | G06F 30/20 |
| 2020/0210824 | A1* | 7/2020 | Poornaki | G06N 3/08 |
| 2020/0309099 | A1* | 10/2020 | Zhang | F03D 7/0292 |
| 2021/0182749 | A1* | 6/2021 | Balasubramanian | G06Q 10/0637 |

FOREIGN PATENT DOCUMENTS

| | | | | |
|---|---|---|---|---|
| CN | 108051211 | A | | 5/2018 |
| CN | 108680358 | A | * 10/2018 | ............ G01M 15/00 |
| CN | 108680358 | A | | 10/2018 |
| EP | 2665928 | B1 | | 4/2016 |
| EP | 2665929 | B1 | | 6/2017 |
| KR | 20140018947 | A | | 2/2014 |
| WO | WO-2014114295 | A1 | * 7/2014 | .......... F03D 11/0091 |

OTHER PUBLICATIONS

International Search Report and Written Opinion of International Searching Authority dated Mar. 9, 2021 for International Application No. PCT/SG2020/050674.
International Preliminary Report on Patentability dated Jan. 7, 2022 for International Application No. PCT/SG2020/050674.
Extended European Search Report dated Dec. 20, 2022 for European Application No. 20893856.3.
Examination Report No. 1 dated May 22, 2023 for Australian Application No. 2020394302.
Examination Report No. 2 dated May 26, 2023 for Australian Application No. 2020394302.

* cited by examiner

METHOD AND APPARATUS FOR DETECTING FAULT, METHOD AND APPARATUS FOR TRAINING MODEL, AND DEVICE AND STORAGE MEDIUM

TECHNICAL FIELD

The embodiments of the present disclosure relate to the field of Internet technology, and in particular to a method and apparatus for detecting a fault, a method and apparatus for training a model, and a device and a storage medium thereof.

BACKGROUND

A wind farm is a power plant composed of a plurality of wind turbines.

In the related art, whether a wind turbine encounters a fault is determined and checked based on the work experience accumulated by the staff, and an early warning is given in time when the wind turbine encounters a fault.

However, the related art relies on the work experience of the staff, which easily causes a high failure rate of the wind turbine.

SUMMARY

Embodiments of the present disclosure provide a method and apparatus for detecting a fault, a method and apparatus for training a model, and a device and a storage medium thereof.

According to a first aspect of embodiments of the present disclosure, a method for detecting a fault for a wind turbine is provided. The method includes:

acquiring characteristic data and actual temperature of a first wind turbine among n wind turbines, wherein the characteristic data of the first wind turbine is intended to characterize a working state of the first wind turbine, and n is an integer greater than 1;

acquiring a prediction temperature set by inputting the characteristic data of the first wind turbine into a temperature prediction model corresponding to each of the n wind turbines; and detecting, based on the predicted temperature set and the actual temperature of the first wind turbine, whether the first wind turbine encounters a fault.

According to a second aspect of embodiments of the present disclosure, a method for training a temperature prediction model is provided. The method includes:

acquiring training data of the temperature prediction model, wherein the training data comprises training samples, the training samples including history temperature of a target wind turbine and characteristic data corresponding to the history temperature, the characteristic data corresponding to the history temperature being intended to characterize a working state of the target wind turbine;

acquiring training data after data cleaning by performing data cleaning on the training data, wherein the training data after data cleaning is intended to train the temperature prediction model;

calculating a predicted temperature corresponding to the characteristic data by the temperature prediction model; and training the temperature prediction model based on the predicted temperature and the history temperature.

According to a third aspect of embodiments of the present disclosure, an apparatus for detecting a fault for a wind turbine is provided. The apparatus includes:

a data acquiring module, configured to acquire characteristic data and an actual temperature of a first wind turbine among n wind turbines, wherein the characteristic data of the first wind turbine is intended to characterize a working state of the first wind turbine, and n is an integer greater than 1;

a temperature acquiring module, configured to acquire a prediction temperature set by inputting the characteristic data of the first wind turbine into a temperature prediction model corresponding to each of the n wind turbines; and a fault detecting module, configured to detect, based on the predicted temperature set and the actual temperature of the first wind turbine, whether the first wind turbine encounters a fault.

According to a fourth aspect of embodiments of the present disclosure, an apparatus for training a temperature prediction model. The apparatus includes:

a data acquiring module, configured to acquire training data of the temperature prediction model, wherein the training data comprises training samples, the training samples including history temperature of a target wind turbine and characteristic data corresponding to the history temperature, the characteristic data corresponding to the history temperature being intended to characterize a working state of the target wind turbine;

a data preprocessing module, configured to acquire training data after data cleaning by performing data cleaning on the training data, wherein the training data after data cleaning is used to train the temperature prediction model;

a temperature calculating module, configured to calculate a predicted temperature corresponding to the characteristic data by the temperature prediction model; and a model training module, configured to train the temperature prediction model based on the predicted temperature and the history temperature.

According to a fifth aspect of the embodiments of the present disclosure, a computer device including a processor and a memory storing a computer program is provided. The computer program, when loaded and executed by the processor, causes the processor to perform the method for detecting the fault for the wind turbine as described in the first aspect, or the method for training the temperature prediction model as described in the second aspect.

According to a sixth aspect of the embodiments of the present disclosure, a non-transitory computer-readable storage medium storing a computer program thereon is provided. The computer program, when loaded and executed by a processor, causes the processor to perform the method for detecting the fault for the wind turbine as described in the first aspect, or the method for training the temperature prediction model as described in the second aspect.

The technical solutions according to the embodiments of the present disclosure may achieve the following beneficial effects:

A predicted temperature is obtained by a temperature prediction model, and whether a wind turbine encounters a fault is detected based on the predicted temperature and actual temperature. Compared with the related art which depends on the working experience of the staff, the technical solutions according to the embodiments of the present disclosure can more accurately detect whether a wind turbine encounters a fault, and provide early warning in time, so as to reduce the failure rate of the wind turbine.

BRIEF DESCRIPTION OF THE DRAWINGS

In order to illustrate technical solutions in embodiments of the present disclosure more clearly, a brief introduction of the drawings used in the embodiments will be provided herein. Obviously, the drawings described below are merely some embodiments of the present disclosure, those skilled in the art can also obtain other drawings according to these drawings without creative work.

DETAILED DESCRIPTION

In order to make the objects, technical solutions, and advantages of the present disclosure clearer, the following will further describe the embodiments of the present disclosure in detail with reference to the accompanying drawings.

Figure 1:
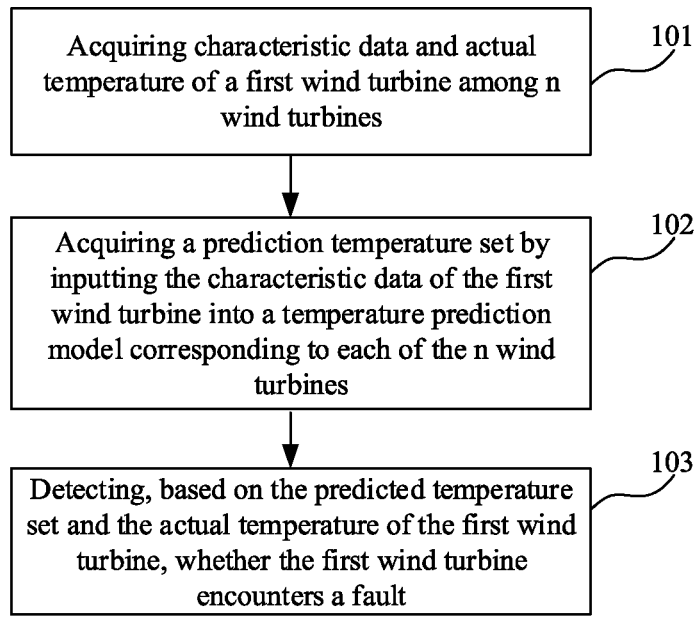
FIG. 1 is a flowchart of a method for detecting a fault for a wind turbine according to an embodiment of the present disclosure.

FIG. 1 shows a flowchart of a method for detecting a fault for a wind turbine according to an embodiment of the present disclosure. An execution subject of the embodiment of the present disclosure may be a computer device, which refers to an electronic device with computing and processing capabilities. For example, the computer device may be a server. The method includes the following steps.

In step 101, characteristic data and actual temperature of a first wind turbine of n wind turbines are acquired.

Wind turbines are electrical equipment that convert wind energy into mechanical energy, which drives a rotor to rotate, and finally outputs alternating current. The first wind turbine may be any wind turbine among the n wind turbines. The characteristic data of the first wind turbine is intended to characterize a working state of the first wind turbine. For example, the characteristic data of the first wind turbine may include at least one of the following: wind speed, wind mill speed, blade angle, yaw angle, active power, turbine speed, and gearbox oil temperature. The embodiment of the present disclosure does not limit the type and number of the characteristic data. In a possible implementation, the characteristic data of the first wind turbine needs to include active power and turbine speed.

In step 102, a predicted temperature set is acquired by inputting the characteristic data of the first wind turbine into a temperature prediction model corresponding to each of the n wind turbines.

The temperature prediction model is used to obtain predicted temperature based on the characteristic data. The predicted temperature may represent healthy temperature (normal temperature) of the first wind turbine under current operating conditions. In the embodiment of the present disclosure, n temperature prediction models include a temperature prediction model corresponding to the first wind turbine, and the temperature prediction models respectively corresponding to n−1 second wind turbines. Exemplarily, the n wind turbines are adjacent wind turbines of the same model. That is, the second wind turbine refers to an adjacent wind turbine of the same model in the same wind farm as the first wind turbine.

In step 103, whether the first wind turbine encounters a fault is detected based on the predicted temperature set and the actual temperature of the first wind turbine.

The predicted temperature set includes n predicted temperatures. When the first wind turbine encounters a fault, the actual temperature of the first wind turbine will be higher than the predicted temperature. Exemplarily, when the actual temperature is higher than multiple predicted temperatures, the first wind turbine encounters a fault, and an early warning may be given at this time.

It should be noted that, in view of the situation that there are few training data of wind turbines in a newly-built wind farm and thus the temperature prediction model cannot be trained, the embodiment of the present disclosure can apply the temperature prediction model of the second wind turbine of the same model as the first the wind turbine in other wind farms to the normal operation data of the first wind turbine to evaluate the prediction effect of the model. If the regression effect of the temperature prediction model meets the requirements for use, the temperature prediction model of the second wind turbine is used to give an alarm. If the regression effect of the temperature prediction model does not meet the requirements for use, a warning strategy of horizontal comparison of full generation temperature data of the same model in the wind farm is adopted. The full generation temperature comparison scheme can effectively overcome the problem of inaccurate machine learning predictions caused by insufficient history data, and realize fault warning with zero history data.

To sum up, in the technical solution according to the embodiment of the present disclosure, a predicted temperature is obtained by a temperature prediction model, and whether a wind turbine encounters a fault is detected based on the predicted temperature and actual temperature. Compared with the related art which depends on the working experience of the staff, the technical solution according to the embodiment of the present disclosure can more accurately detect whether a wind turbine encounters a fault, and provide early warning in time, so as to reduce the failure rate of the wind turbine.

In addition, in view of the problem that the related art relies heavily on the normal history data of the first wind turbine, the embodiment of the present disclosure provides a horizontal comparison and cross validation method. If the first wind turbine encounters a fault, its history data will also be affected, while the second wind turbine will not be affected by the fault. The data of the second wind turbine is normal under a high probability. Detecting the first wind turbine based on the predicted temperature obtained by the temperature prediction models corresponding to multiple second wind turbines avoids the problem of false alarms caused by detecting the first wind turbine based only on the predicted temperature obtained by the temperature prediction model corresponding to the first wind turbine, and improves the early warning recall rate.

In the embodiment of the present disclosure, each of the n wind turbines includes m components. The temperature prediction model corresponding to each wind turbine includes a component temperature prediction model corresponding to each of the m components of each wind turbine, where m is a positive integer. Optionally, whether the component included in the first wind turbine encounters a fault is detected in the following manner.

1. Component characteristic data of each of the m components of the first wind turbine and actual temperature of each of the m components of the first wind turbine are acquired.

2. For the $i^{th}$ component of the m components of the first wind turbine, a predicted temperature set of the $i^{th}$ component is acquired by inputting component characteristic data of the $i^{th}$ component t into a component temperature prediction model of the $i^{th}$ component of each of the n wind turbines, where i is a positive integer less than or equal to m.

Exemplarily, the wind turbine includes at least one of the following components: turbine drive end bearing, turbine non-drive end bearing, gearbox high speed shaft drive end bearing, gearbox high speed shaft non-drive end bearing, gearbox intermediate shaft drive end bearing, gearbox intermediate shaft non-driving end bearing, spindle front bearing, and spindle rear bearing. Of course, in other possible implementations, the wind turbine further includes other components, and the embodiment of the present disclosure does not limit the types of components. Optionally, each component has its corresponding component temperature prediction model.

In the embodiment of the present disclosure, the component temperature prediction model of the $i^{th}$ component of each wind turbine outputs a predicted temperature. That is, the predicted temperature set includes n predicted temperatures.

3. Whether the $i^{th}$ component encounters a fault is detected based on the predicted temperature set of the $i^{th}$ component and the actual temperature of the $i^{th}$ component.

Figure 2:
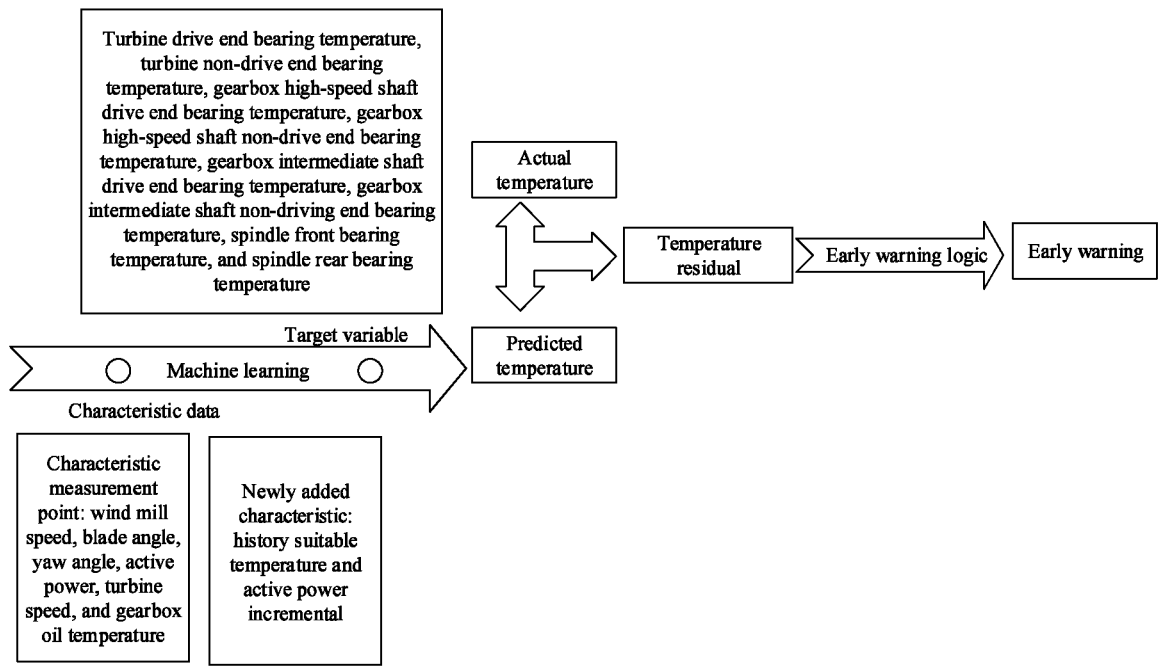
FIG. 2 is an architecture diagram of a method for detecting a fault according to an embodiment of the present disclosure.

In an example, as shown in FIG. 2, whether the $i^{th}$ component encounters a fault is detected in the following manner.

3.1. A residual value set of the $i^{th}$ component is acquired by calculating a residual value between each predicted temperature of the predicted temperature set of the $i^{th}$ component and the actual temperature of the $i^{th}$ component respectively.

Assuming that there are 3 wind turbines, the component characteristic data of the $i^{th}$ component is input into the component temperature prediction model of the $i^{th}$ component of each of the above three wind turbines, and 3 predicted temperatures are acquired, respectively 30° C. and 31° C. and 32° C., and the actual temperature of the $i^{th}$ component is 38° C., then residual values between the 3 predicted temperatures and the actual temperature are calculated and 3 residual values are acquired, which are 8, 7, and 6 respectively.

3.2. The number of residual values greater than a threshold in the residual value set of the $i^{th}$ component is acquired.

The threshold may be set according to history experience. Assuming that the threshold is 5, the above example is still taken as an example, then the number of residual values greater than 5 is 3.

3.3. Whether the number is greater than a preset number is detected.

The preset number may be proportional to n. For example, the preset number may be ½ of n.

3.4. If the number is greater than the preset number, it is determined that the $i^{th}$ component encounters a fault. The preset number may be 2.

Since 3 is greater than 2, it may be determined that the $i^{th}$ component encounters a fault.

In another example, whether the $i^{th}$ component encounters a fault is detected in the following manner.

First, whether a target residual value corresponding to a target component temperature prediction model in the component temperature prediction model of the $i^{th}$ component of each of the n wind turbines is greater than a threshold is detected.

In the embodiment of the present disclosure, the target residual value refers to a residual value between a predicted temperature corresponding to the target component temperature prediction model and the actual temperature of the $i^{th}$ component.

Second, if the target residual value is greater than the threshold, it is determined that the target wind turbine corresponding to the target component temperature prediction model detects that the $i^{th}$ component has an abnormality.

Third, whether the number of times that the target wind turbine detects that the $i^{th}$ component has an abnormality is greater than a preset number of times within a preset time period is determined.

The preset time period may be one week or 3 days, and the preset time period may be set by a technician.

Fourth, if the number of times is greater than the preset number, the target wind turbine is determined as an early warning wind turbine.

If it is determined that the $i^{th}$ component encounters a fault when the target wind turbine detects that the $i^{th}$ component has one abnormality, there may be a misjudgment. When the number of times that the target wind turbine detects that the $i^{th}$ component has an abnormality within the preset time period is greater than the preset number of times, it may be determined that the target wind turbine determines that the $i^{th}$ component encounters a fault.

Fifth, if the proportion of the early warning wind turbines among the n wind turbines is greater than a preset proportion, it is determined that the $i^{th}$ component encounters a fault.

When wind turbines exceeding a certain proportion among the n wind turbines determine that the $i^{th}$ component encounters a fault, it may be determined that the $i^{th}$ component does have a fault.

To sum up, in the technical solution according to the embodiment of the present disclosure, whether a component encounters a fault is detected according to a predicted temperature and an actual temperature. The component is a core component of a wind turbine, and the operation and maintenance cost caused by component failure is as high as 40% of all the operation and maintenance costs. Therefore, by identifying whether there are component failures in the wind turbine and giving an early warning in time, it is possible to carry out targeted wind turbine operation and maintenance in advance, saving component maintenance costs, and reducing power generation loss caused by unplanned shutdowns due to component failures.

In addition, when the number of residual values greater than the threshold among the n residual values is greater than the preset number, it is determined that the component encounters a fault, and the fault detection of the component takes a short time.

When the number of times that the target wind turbine detects that the component has an abnormality is greater than the preset number of times, the target wind turbine is determined as an early warning wind turbine. When the proportion of the early warning wind turbines is greater than the preset proportion, it is determined that the component encounters a fault, thus component failure detection is more accurate.

Figure 3:
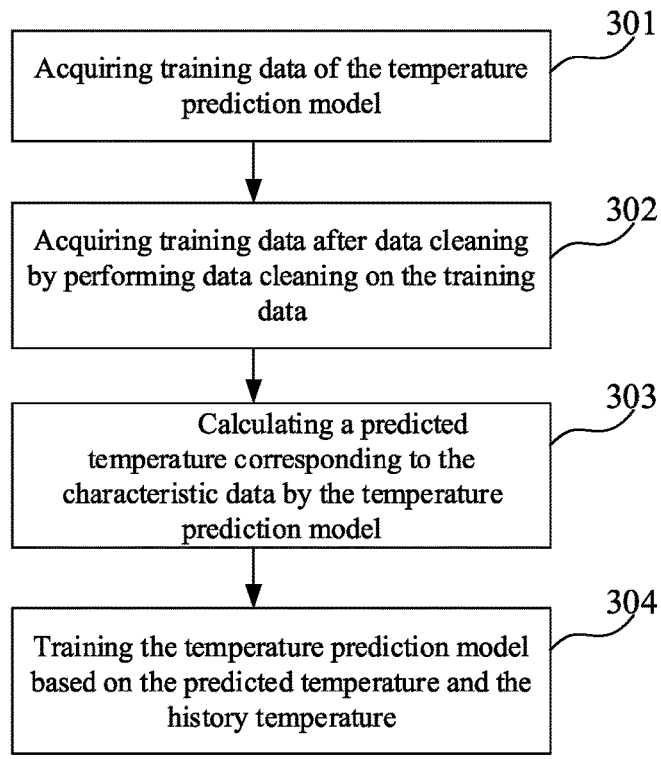
FIG. 3 is a flowchart of a method for a training temperature prediction model according to an embodiment of the present disclosure.

FIG. 3 shows a flowchart of a method for training a temperature prediction model according to an embodiment of the present disclosure. An execution subject of the above method may be a computer device, which refers to an electronic device with computing and processing capabilities. For example, the computer device may be a server. The method includes the following steps.

In step 301, training data of the temperature prediction model is acquired.

In the embodiment of the present disclosure, the training data includes training samples. Illustratively, the training data includes at least 3000 training samples. The training samples include history temperature of a target wind turbine and characteristic data corresponding to the history temperature. The characteristic data corresponding to the history temperature is intended to characterize a working state of the target wind turbine.

In step 302, training data after data cleaning is acquired by performing data cleaning on the training data.

In the embodiment of the present disclosure, the training data after data cleaning is used to train the temperature prediction model. Before training the temperature prediction model, the training data is cleaned first, which can improve the accuracy of the temperature prediction model.

In step 303, a predicted temperature corresponding to the characteristic data is calculated by the temperature prediction model.

A predicted temperature corresponding to the characteristic data is acquired by inputting the characteristic data into the temperature prediction model.

In step 304, the temperature prediction model is trained based on the predicted temperature and the history temperature.

When a difference between the predicted temperature and the history temperature is less than a preset difference, the training of the temperature prediction model is stopped. Of course, in other possible implementations, when the number of training times is greater than a preset number of times, the training of the temperature prediction model is stopped.

The temperature prediction model may be trained using feature engineering methods to add characteristic data within a few hours of history, for example, the rotor speed within a few hours of history, to improve the accuracy of the temperature prediction model.

Optionally, the temperature prediction model may be a LightGBM model, a random forest model, or a support vector regression (SVR) model.

It should be noted that the present disclosure needs to establish temperature prediction models for all wind turbines in the same wind farm. The temperature prediction model may be updated every preset duration. For example, the temperature prediction model is updated every three months.

In summary, in the technical solution according to the embodiment of the present disclosure, a temperature prediction model is trained by a predicted temperature corresponding to characteristic data and a history temperature corresponding to the characteristic data, and the temperature prediction model that is finally trained is used to detect whether a wind turbine encounters a fault, which can reduce the failure rate of the wind turbine.

In one example, data cleaning may include at least one of the following: cleaning dead numbers (dead numbers refer to continuous and constant values), cleaning out-of-limit data (out-of-limit data refers to data that exceeds a preset range), cleaning data that does not correspond to history environmental conditions (for example, history temperature data that does not correspond to history environmental temperature, history power data that does not correspond to history wind power).

In another example, the training data may be preprocessed based on density: taking the history temperature and the characteristic data corresponding to the history temperature as a data point; and removing data points which do not belong mass distribution based on the distribution density of the data points.

In still another example, the training data may be preprocessed based on the history data of the wind turbines of the same model in the wind farm: acquiring a history temperature of a wind turbine of the same model as the target wind turbine in the wind farm and a history temperature corresponding to the characteristic data; and based on the characteristic data of the same size, a history temperature after cleaning by buckets is acquired by cleaning the history temperature by buckets.

The training data of the temperature prediction model needs to use normal data. If the temperature prediction model contains a large amount of abnormally high temperature training data, it will make the prediction temperature very high, resulting in failure to report. Compared with the related art in which the out-of-limit data is simply cleaned up, resulting in that the training data includes certain abnormally high temperature data, and that when the temperature of the wind turbine is detected by the trained temperature prediction model, the predicted temperature may be higher, and thus the residual value is small and the incidence of underreporting is high, the embodiment of the present disclosure can effectively ensure that the abnormal data is cleaned up by deeper data cleaning, thereby reducing the incidence of underreporting.

Figure 4:
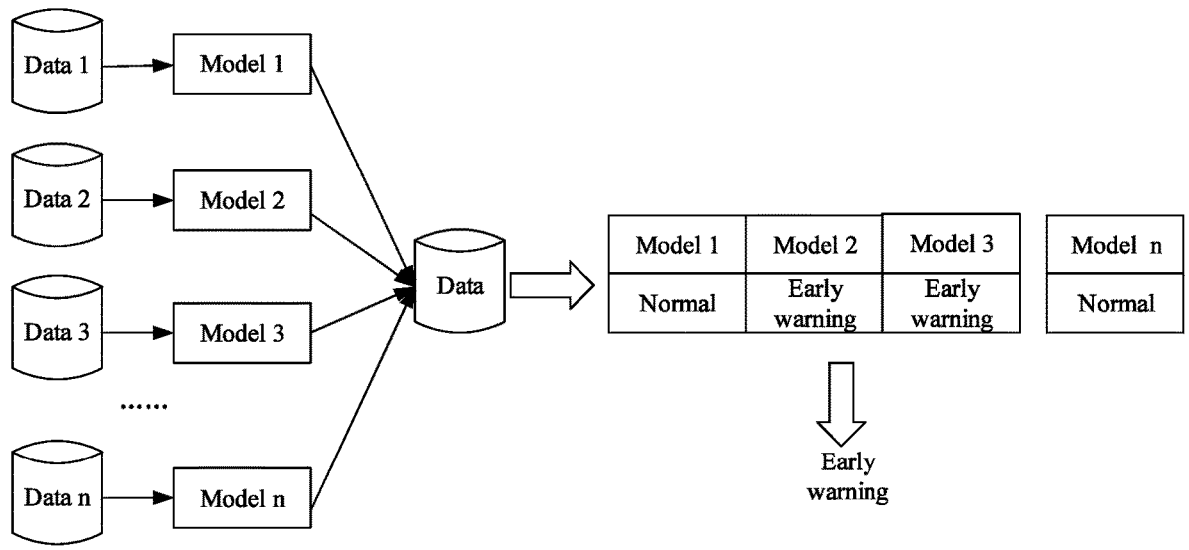
FIG. 4 is an architecture diagram of a temperature prediction model according to an embodiment of the present disclosure after being trained to an application.

FIG. 4 shows an architecture diagram of a temperature prediction model according to an embodiment of the present disclosure after being trained for application. For n wind turbines, the corresponding temperature prediction models are trained and n temperature prediction models are acquired. Each wind turbine uses its own training data to train the temperature prediction model. Real-time characteristic data of a first wind turbine is input into the temperature prediction model corresponding to each of the n wind turbines, and a predicted temperature set is acquired. Whether the first wind turbine encounters a fault is detected based on the predicted temperature set and the actual temperature. When the proportion of early warning wind turbines is greater than a preset proportion, it is determined that the first wind turbine encounters a fault, and an early warning is given.

Described hereinafter are apparatus embodiments of the present disclosure, which may be used to implement the method embodiments of the present disclosure. For details not disclosed in the apparatus embodiment of the present disclosure, reference may be made to the method embodiments of the present disclosure.

Figure 5:
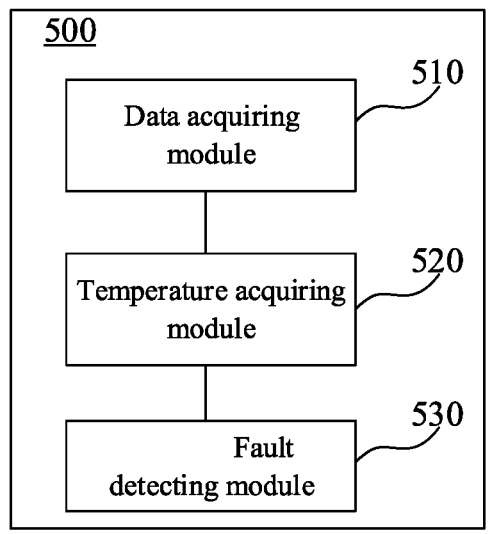
FIG. 5 is a block diagram of an apparatus for detecting a fault for a wind turbine according to an embodiment of the present disclosure.

FIG. 5 shows a block diagram of an apparatus for detecting a fault for a wind turbine according to an embodiment of the present disclosure. The apparatus has a function of implementing the above method example. The function may be realized by hardware, or by hardware executing corresponding software. The apparatus 500 may include a data acquiring module 510, a temperature acquiring module 520, and a fault detecting module 530.

The data acquiring module 510 is configured to acquire characteristic data and an actual temperature of a first wind turbine among n wind turbines, wherein the characteristic data of the first wind turbine is intended to characterize a working state of the first wind turbine, and n is an integer greater than 1.

The temperature acquiring module 520 is configured to acquire a prediction temperature set by inputting the characteristic data of the first wind turbine into a temperature prediction model corresponding to each of the n wind turbines.

The fault detecting module 530 is configured to detect, based on the predicted temperature set and the actual temperature of the first wind turbine, whether the first wind turbine encounters a fault.

To sum up, in the technical solution according to the embodiment of the present disclosure, a predicted temperature is obtained by a temperature prediction model, and whether a wind turbine encounters a fault is detected based on the predicted temperature and an actual temperature. Compared with the related art which depends on the working experience of the staff, the technical solution according to the embodiment of the present disclosure can more accurately detect whether a wind turbine encounters a fault, and provide an early warning in time, so as to reduce the failure rate of the wind turbine.

Optionally, the n wind turbines are adjacent wind turbines of a same model.

Optionally, each of the n wind turbines includes m components, and the temperature prediction model corresponding to each of the wind turbines includes a component temperature prediction model corresponding to each of the m components of the wind turbine, where m is a positive integer.

The data acquiring module 510 is configured to acquire component characteristic data of each of the m components of the first wind turbine, and an actual temperature of each of the m components of the first wind turbine.

The temperature acquiring module 520 is configured to acquire a predicted temperature set of an $i^{th}$ component of the m components of the first wind turbine by inputting component characteristic data of the $i^{th}$ component into a component temperature prediction model of the $i^{th}$ component of each of the n wind turbines, where i is a positive integer less than or equal to m.

The fault detection module 530 is configured to detect, based on the predicted temperature set of the $i^{th}$ component and the actual temperature of the $i^{th}$ component, whether the $i^{th}$ component encounters a fault.

Optionally, the fault detection module 530 is configured to:

acquire a residual value set of the $i^{th}$ component by calculating a residual value between each predicted temperature in the predicted temperature set of the $i^{th}$ component and the actual temperature of the $i^{th}$ component respectively;

acquire the number of residual values greater than a threshold in the residual value set of the $i^{th}$ component;

detect whether the number is greater than a preset number; and determine that the $i^{th}$ component encounters the fault if the number is greater than the preset number.

Optionally, the fault detection module 530 is configured to:

detect whether a target residual value corresponding to a target component temperature prediction model in the component temperature prediction model of the $i^{th}$ component of each of the n wind turbines is greater than a threshold, wherein the target residual value refers to a residual value between a predicted temperature corresponding to the target component temperature prediction model and the actual temperature of the $i^{th}$ component;

if the target residual value is greater than the threshold, determine that a target wind turbine corresponding to the target component temperature prediction model detects that the $i^{th}$ component has an abnormality;

determine within a preset time period whether the number of times that the target wind turbine detects that the $i^{th}$ component has an abnormality is greater than a preset number of times;

determining the target wind turbine as an early warning wind turbine if the number of times is greater than the preset number of times; and determining that the $i^{th}$ component encounters the fault if a proportion of the early warning wind turbines among the n wind turbines is greater than a preset proportion.

Figure 6:
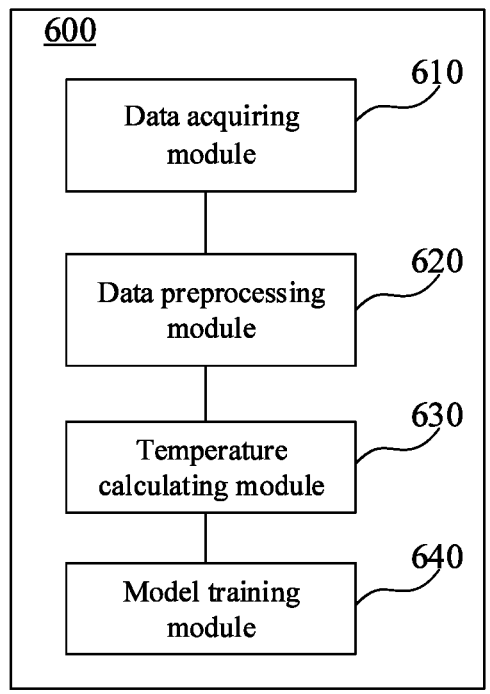
FIG. 6 is a block diagram of an apparatus for training a temperature prediction model according to an embodiment of the present disclosure.

FIG. 6 shows a block diagram of an apparatus for training a temperature prediction model according to an embodiment of the present disclosure. The apparatus has a function of implementing the above method example. The function may be realized by hardware, or by hardware executing corresponding software. The apparatus 600 may include a data acquiring module 610, a data preprocessing module 620, a temperature calculating module 630, and a model training module 640.

The data acquiring module 610 is configured to acquire training data of the temperature prediction model, wherein the training data includes training samples, the training samples including a history temperature of a target wind turbine and characteristic data corresponding to the history temperature, the characteristic data corresponding to the history temperature being intended to characterize a working state of the target wind turbine.

The data preprocessing module 620 is configured to acquire training data after data cleaning by performing data cleaning on the training data, wherein the training data after data cleaning is intended to train the temperature prediction model.

The temperature calculating module 630 is configured to calculate a predicted temperature corresponding to the characteristic data by the temperature prediction model.

The model training module 640 is configured to train the temperature prediction model based on the predicted temperature and the history temperature.

In summary, in the technical solution according to the embodiment of the present disclosure, a temperature prediction model is trained by a predicted temperature corresponding to characteristic data and a history temperature corresponding to the characteristic data, and the temperature prediction model that is finally trained is used to detect whether a wind turbine encounters a fault, which can reduce the failure rate of the wind turbine.

It should be noted that, when the apparatus according to the above embodiment realizes its functions, only the division of the above functional modules is used for illustration. In actual applications, the above functions may be allocated to different functional modules according to actual needs. That is, the content structure of the device is divided into different functional modules to complete all or part of the functions described above.

Regarding the apparatus in the foregoing embodiment, the specific manner in which each module performs the operation has been described in detail in the embodiment of the method, and detailed description will not be given here.

Figure 7:
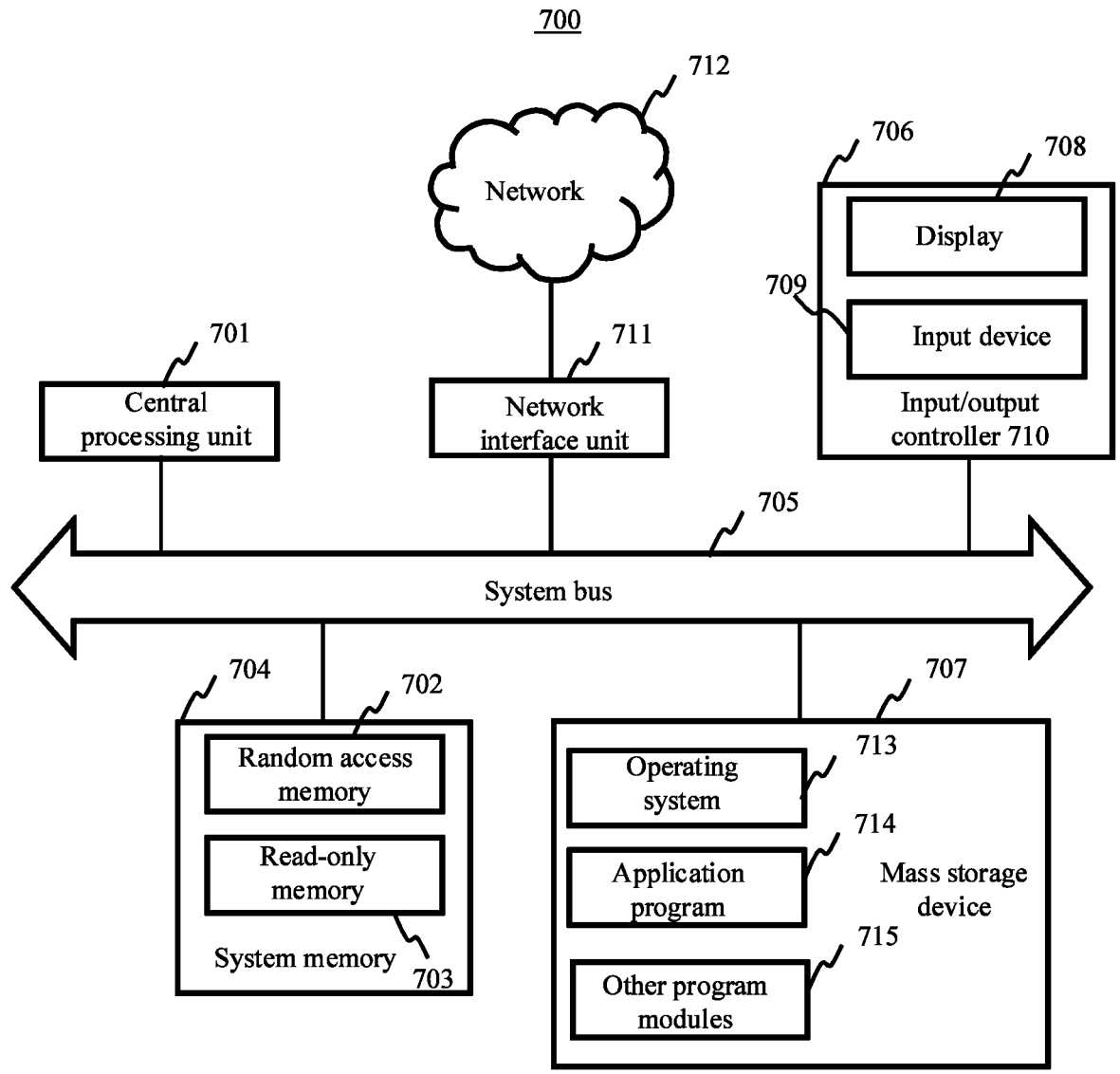
FIG. 7 is a schematic structural diagram of a computer device according to an embodiment of the present disclosure.

FIG. 7 shows a schematic structural diagram of a computer device according to an embodiment of the present disclosure. The computer device is used to implement the method according to the foregoing embodiment.

The computer device 700 includes a central processing unit (CPU) 701, a system memory 704 including a random access memory (RAM) 702 and a read-only memory (ROM) 703, and a system bus 705 connecting the system memory 704 and the central processing unit 701. The computer device 700 also includes a basic input/output system (I/O system) 706 that helps to transfer information between various devices in the computer, and a mass storage device 707 storing an operating system 713, an application program 714, and other program modules 715.

The basic input/output system 706 includes a display 708 for displaying information and an input device 709 such as a mouse and a keyboard for a user to input information. The display 708 and the input device 709 are both connected to the central processing unit 701 by an input and output controller 710 connected to the system bus 705. The basic input/output system 706 may also include the input and output controller 710 for receiving and processing input from multiple other devices such as a keyboard, a mouse, or an electronic stylus. Similarly, the input and output controller 710 also provides output to a display screen, a printer, or other types of output devices.

The mass storage device 707 is connected to the central processing unit 701 by a mass storage controller (not shown) connected to the system bus 705. The mass storage device 707 and its associated computer-readable medium provide non-volatile storage for the computer device 700. That is, the mass storage device 707 may include a computer-readable medium (not shown) such as a hard disk or a CD-ROM (Compact Disk Read-Only Memory) drive.

Without loss of generality, the computer-readable medium may include computer storage medium and communication medium. The computer storage medium includes volatile and nonvolatile, removable and non-removable medium implemented in any method or technology for storing information such as computer-readable instructions, data structures, program modules or other data. The computer storage medium include RAM, ROM, EPROM (Erasable Programmable Read-Only Memory), EEPROM (Electrically Erasable Programmable Read-Only Memory), flash memory or other solid state storage technology, CD-ROM, DVD (Digital Versatile Disc) or other optical storage, tape cassette, magnetic tape, disk storage or other magnetic storage devices. Of course, those skilled in the art may know that the computer storage medium is not limited to the foregoing. The aforementioned system memory 704 and mass storage device 707 may be collectively referred to as memory.

According to various embodiments of the present disclosure, the computer device 700 may also be connected to a remote computer on the network by a network such as the Internet to run. That is, the computer device 700 may be connected to a network 712 by a network interface unit 711 connected to the system bus 705, or in other words, the network interface unit 711 may also be used to connect to other types of networks or remote computer systems (not shown).

In an exemplary embodiment, a non-transitory computer-readable storage medium is provided. When being executed by a processor of the computer device 700, an instruction (or a computer program) in the storage medium enables the computer device 800 to execute the above method.

Optionally, the non-transitory computer-readable storage medium may be ROM, random access memory (RAM), CD-ROM, magnetic tape, floppy disk, optical data storage device, or the like.

Described above are merely exemplary embodiments of the present disclosure, which are not intended to limit the present disclosure. Any modifications, equivalent replacements and improvements made within the spirits and principles of the present disclosure shall all fall in the protection scope of the present disclosure.

What is claimed is:

1. A method for detecting a fault in a wind turbine, comprising:
acquiring characteristic data and actual temperature of a first wind turbine among n wind turbines, wherein the characteristic data of the first wind turbine is intended to characterize a working state of the first wind turbine, and n is an integer greater than 1;
acquiring a prediction temperature set including a plurality of predicted temperatures by inputting the characteristic data of the first wind turbine into a plurality of temperature prediction models, each temperature prediction model corresponding to one of the n wind turbines; and
detecting, based on the predicted temperature set and the actual temperature of the first wind turbine, whether the first wind turbine encounters a fault.

2. The method according to claim 1, wherein the n wind turbines are adjacent wind turbines of a same model.

3. The method according to claim 1, wherein each of the n wind turbines includes m components, and each temperature prediction model corresponding to one of the wind turbines comprises: a plurality of component temperature prediction models, each component temperature prediction model corresponding to one of the m components of the wind turbine, where m is a positive integer;
acquiring characteristic data and actual temperature of the first wind turbine comprises:
acquiring component characteristic data of each of the m components of the first wind turbine, and actual temperature of each of the m components of the first wind turbine;
acquiring the predicted temperature set by inputting the characteristic data of the first wind turbine into the plurality of temperature prediction models:
acquiring a predicted temperature set of an $i^{th}$ component of them components of the first wind turbine by inputting component characteristic data of the $i^{th}$ component into a component temperature prediction model of the $i^{th}$ component of each of the n wind turbines, where i is a positive integer less than or equal to m; and
detecting, based on the predicted temperature set and the actual temperature of the first wind turbine, whether the first wind turbine encounters the fault comprises:
detecting, based on the predicted temperature set of the $i^{th}$ component and the actual temperature of the $i^{th}$ component, whether the $i^{th}$ component encounters a fault.

4. The method according to claim 3, wherein detecting, based on the predicted temperature set of the $i^{th}$ component and the actual temperature of the $i^{th}$ component, whether the $i^{th}$ component encounters the fault comprises:
acquiring a residual value set of the $i^{th}$ component by calculating a residual value between each predicted temperature in the predicted temperature set of the $i^{th}$ component and the actual temperature of the $i^{th}$ component respectively;
acquiring the number of residual values greater than a threshold in the residual value set of the $i^{th}$ component;
detecting whether the number is greater than a preset number; and
determining that the $i^{th}$ component encounters the fault if the number is greater than the preset number.

5. The method according to claim 3, wherein detecting, based on the predicted temperature set of the $i^{th}$ component and the actual temperature of the $i^{th}$ component, whether the $i^{th}$ component encounters the fault comprises:

detecting whether a target residual value corresponding to a target component temperature prediction model in the component temperature prediction model of the $i^{th}$ component of each of the n wind turbines is greater than a threshold, wherein the target residual value refers to a residual value between a predicted temperature corresponding to the target component temperature prediction model and the actual temperature of the $i^{th}$ component;

if the target residual value is greater than the threshold, determining that the target wind turbine corresponding to the target component temperature prediction model detects that the $i^{th}$ component has an abnormality;

determining within a preset time period whether the number of times that the target wind turbine detects that the $i^{th}$ component has an abnormality is greater than a preset number of times;

determining the target wind turbine as an early warning wind turbine if the number of times is greater than the preset number of times; and determining that the $i^{th}$ component encounters the fault if a proportion of the early warning wind turbines among the n wind turbines is greater than a preset proportion.

6. A computer device comprising a processor and a memory storing a computer program, wherein the computer program, when loaded and executed by the processor, causes the processor to perform the method for detecting the fault for the wind turbine as defined in claim 1.

7. A non-transitory computer-readable storage medium with a computer program stored thereon, wherein the computer program, when loaded and executed by a processor, causes the processor to perform the method for detecting the fault for the wind turbine as defined in claim 1.

8. A method for training a temperature prediction model, comprising:

acquiring training data of the temperature prediction model, wherein the training data comprises training samples, the training samples comprising history temperature of a target wind turbine and active power and turbine speed corresponding to the history temperature, the active power and turbine speed corresponding to the history temperature being intended to characterize a working state of the target wind turbine;

acquiring training data after data cleaning by performing data cleaning on the training data, wherein the training data after data cleaning is intended to train the temperature prediction model;

calculating a predicted temperature corresponding to the active power and turbine speed by the temperature prediction model; and training the temperature prediction model based on the predicted temperature and the history temperature.

9. A computer device for detecting a fault for a wind turbine, comprising:

a data acquiring module, configured to acquire characteristic data and an actual temperature of a first wind turbine among n wind turbines, wherein the characteristic data of the first wind turbine is intended to characterize a working state of the first wind turbine, and n is an integer greater than 1;

a temperature acquiring module, configured to acquire a prediction temperature set including a plurality of predicted temperatures by inputting the characteristic data of the first wind turbine into a plurality of temperature prediction models, each temperature prediction model corresponding to one of the n wind turbines; and a fault detecting module, configured to detect, based on the predicted temperature set and the actual temperature of the first wind turbine, whether the first wind turbine encounters a fault.

10. A computer device for training a temperature prediction model, comprising:

a data acquiring module, configured to acquire training data of the temperature prediction model, wherein the training data comprises training samples, the training samples comprising history temperature of a target wind turbine and active power and turbine speed corresponding to the history temperature, the active power and turbine speed corresponding to the history temperature being intended to characterize a working state of the target wind turbine;

a data preprocessing module, configured to acquire training data after data cleaning by performing data cleaning on the training data, wherein the training data after data cleaning is intended to train the temperature prediction model;

a temperature calculating module, configured to calculate a predicted temperature corresponding to the active power and turbine speed by the temperature prediction model; and a model training module, configured to train the temperature prediction model based on the predicted temperature and the history temperature.

* * * * *